(12) United States Patent
Itoh

(10) Patent No.: US 10,587,765 B2
(45) Date of Patent: Mar. 10, 2020

(54) IMAGE FORMING APPARATUS, COMMUNICATION SYSTEM, AND PROGRAM

(71) Applicant: KONICA MINOLTA, INC., Chiyoda-ku, Tokyo (JP)

(72) Inventor: Ayumi Itoh, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 156 days.

(21) Appl. No.: 15/160,641

(22) Filed: May 20, 2016

(65) Prior Publication Data

US 2016/0373460 A1 Dec. 22, 2016

(30) Foreign Application Priority Data

Jun. 17, 2015 (JP) ................. 2015-122051

(51) Int. Cl.
*H04L 29/00* (2006.01)
*H04N 1/00* (2006.01)
(Continued)

(52) U.S. Cl.
CPC ....... *H04N 1/00464* (2013.01); *H04L 47/803* (2013.01); *H04L 63/168* (2013.01); *H04L 63/20* (2013.01); *H04L 67/02* (2013.01); *H04L 67/32* (2013.01); *H04N 1/00411* (2013.01); *H04N 2201/0094* (2013.01)

(58) Field of Classification Search
CPC ....... H04L 63/105; H04L 67/02; H04L 67/32; H04L 47/803; H04N 1/00411; H04N 1/00464; H04N 2201/0094
See application file for complete search history.

(56) References Cited

U.S. PATENT DOCUMENTS

| 2009/0064302 A1* | 3/2009 | Colella | ............. G06Q 20/3674 726/9 |
| 2009/0204984 A1* | 8/2009 | Nagai | ................. G06F 21/6218 725/5 |
| 2014/0109186 A1* | 4/2014 | Oikonomidis | ...... G06F 21/6218 726/4 |

FOREIGN PATENT DOCUMENTS

| EP | 2077501 A1 * | 7/2009 | ......... G06F 21/6218 |
| JP | 2003186842 A * | 7/2003 | |
| JP | 2018144296 A * | 9/2018 | ........... G06F 3/1292 |

* cited by examiner

*Primary Examiner* — Jeffrey C Pwu
*Assistant Examiner* — Helai Salehi
(74) *Attorney, Agent, or Firm* — Holtz, Holtz & Volek PC

(57) ABSTRACT

A communication system includes: an image forming apparatus including a browser function and being configured to set permission/non-permission for access according to a website being a communication destination; and a setting change apparatus configured to communicate with the image forming apparatus and be capable of changing a setting of the image forming apparatus in accordance with an operation of an administrator, wherein the image forming apparatus includes a detection unit configured to detect that the image forming apparatus is not allowed to access a specific website, an acquisition unit configured to automatically acquire access destination information, identification information, and contact information, and a change request unit configured to transmit a request to change the setting to a setting that permits the image forming apparatus to access the specific website, to the administrator via a network, the identification information, and the contact information, which are acquired by the acquisition unit.

20 Claims, 12 Drawing Sheets

(51) Int. Cl.
*H04L 29/08* (2006.01)
*H04L 12/927* (2013.01)
*H04L 29/06* (2006.01)

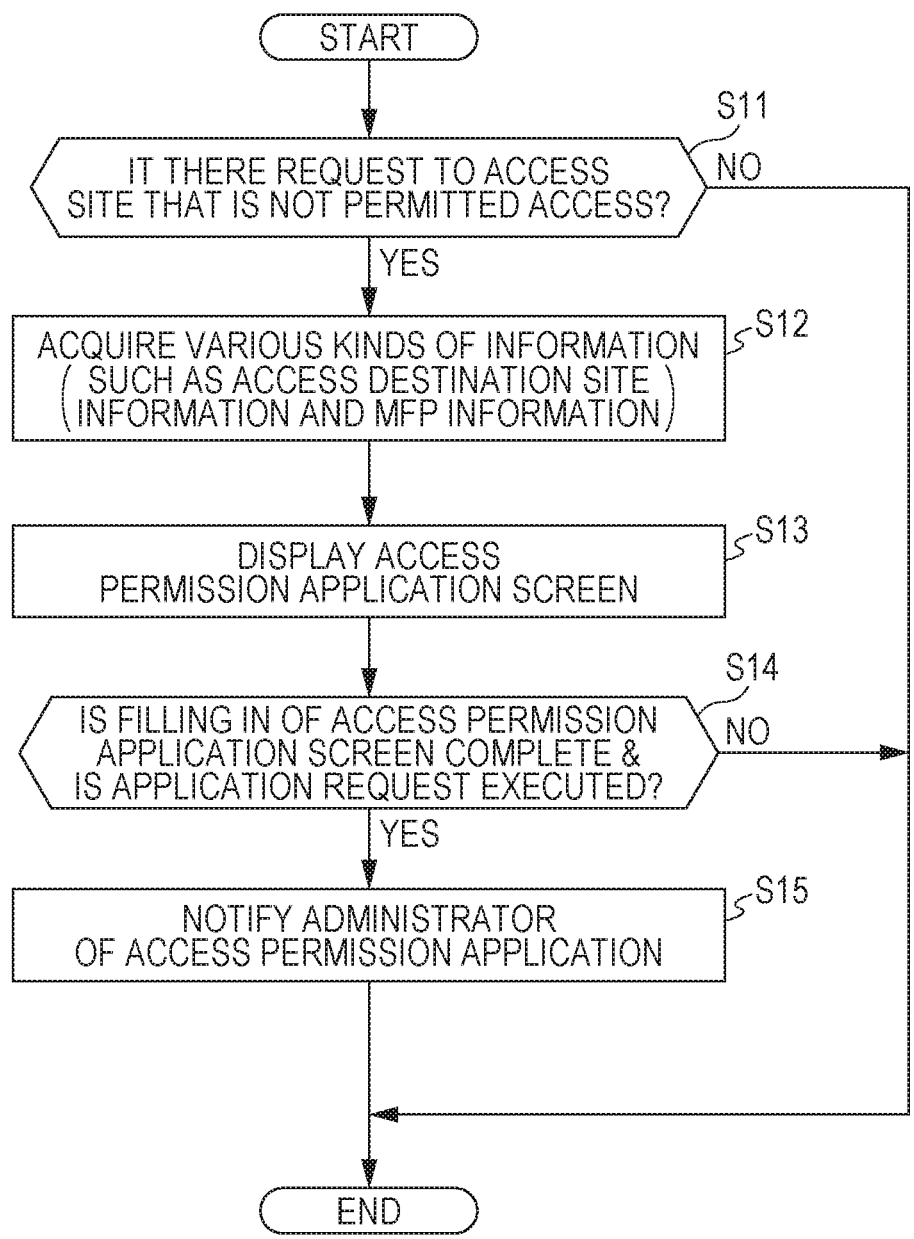

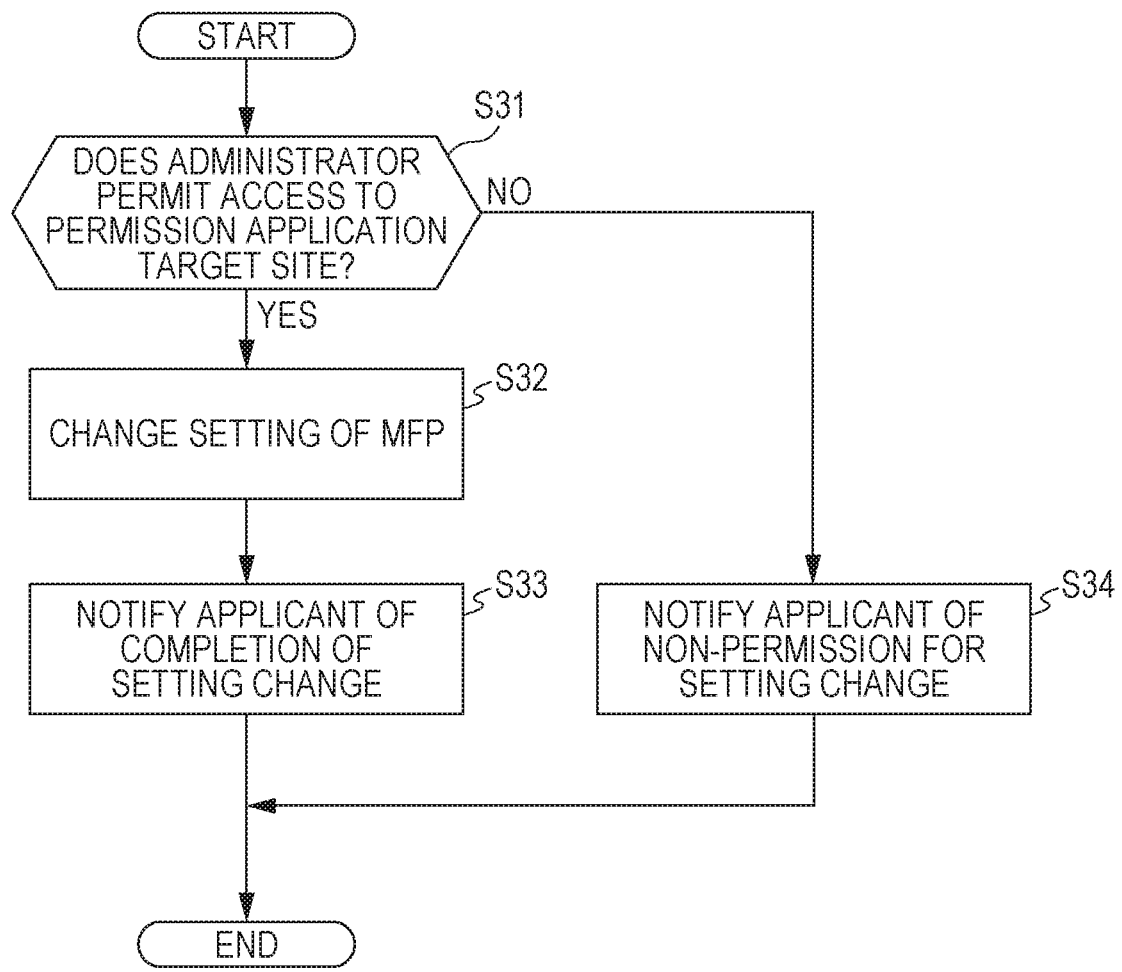

```
ACCESS PERMISSION APPLICATION

<APPLICATION SCREEN>
APPLICATION TARGET SITE   : https://www.siteE1.co.jp/
APPLICANT                 : USER U1
APPLICANT'S EMAIL ADDRESS : userU1@aaa.com
APPLYING APPARATUS        : MFP NO. 1

PLEASE FILL IN REASONS FOR APPLICATION BELOW.
REASONS FOR APPLICATION   : [BUSINESS NECESSITY]

DO YOU WANT TO APPLY FOR ACCESS PERMISSION
TO ADMINISTRATOR WITH ABOVE CONTENT?

[ CANCEL ]     [ OK ]
```

<ACCESS PERMISSION APPLICATION MAIL>

TO: ADMINISTRATOR M1
FROM: MFP NO. 1
SUBJECT: ACCESS PERMISSION APPLICATION

TO ADMINISTRATOR M1

ACCESS PERMISSION APPLICATION WITH FOLLOWING CONTENT HAS ARRIVED.
PLEASE CONSIDER CHANGE IN ACCESS SETTING.

| | |
|---|---|
| APPLICATION TARGET SITE | : https://www.siteE1.co.jp/ |
| APPLICANT | : USER U1 (UserID: ABCDE) |
| APPLICANT'S EMAIL ADDRESS | : userU1@aaa.com |
| APPLYING APPARATUS | : MFP NO. 1 (MAC: 11: 22: 33: 44: 55: 66) |
| REASONS FOR APPLICATION | : BUSINESS NECESSITY |

<BEFORE SETTING CHANGE>
40

| URL OF PERMITTED SITE | DATE OF PERMISSION | SECURITY SETTING |
|---|---|---|
| https://www.siteE3.co.jp/ | 2015/01/01 | NONE |
| https://www.siteE2.co.jp/ | 2015/01/01 | TLS1.1 |

<AFTER SETTING CHANGE>
40

| URL OF PERMITTED SITE | DATE OF PERMISSION | SECURITY SETTING |
|---|---|---|
| https://www.siteE3.co.jp/ | 2015/01/01 | NONE |
| https://www.siteE2.co.jp/ | 2015/01/01 | TLS1.1 |
| https://www.siteE1.co.jp/ | 2015/04/01 | TLS1.3 |

ACCESS TO FOLLOWING
PENDING SITE HAS BEEN PERMITTED.

"https://www.siteE1.co.jp/"

ACCESS PERMISSION APPLICATION
FOR FOLLOWING SITE WAS REJECTED.

"https://www.siteE1.co.jp/"

OK

IMAGE FORMING APPARATUS, COMMUNICATION SYSTEM, AND PROGRAM

The entire disclosure of Japanese Patent Application No. 2015-122051 filed on Jun. 17, 2015 including description, claims, drawings, and abstract are incorporated herein by reference in its entirety.

BACKGROUND OF THE INVENTION

Field of the Invention

The present invention relates to an image forming apparatus such as an MFP (Multi-Functional Peripheral), and a technology related to the image forming apparatus.

Description of the Related Art

Some MFPs and the like (image forming apparatuses) have a web access function (web browser function). Specifically, there are MFPs that can access various websites through web browsers and display contents of the various websites on their display units.

Moreover, it is characteristic of an MFP to be placed in a company or the like and shared among a plurality of users. Due to such a characteristic and the like, an MFP having the web browser function may be desired to restrict websites that the MFP can access to only part of sites.

For example, in terms of the MFP's access to websites, especially the assurance of security is strongly desired. It is especially preferable in the MFP that the MFP is allowed to access only websites that have been judged to be secure. On the other hand, it is especially preferable that the MFP is prohibited to access websites that have been judged to be insecure or websites that have not yet been judged to be secure.

Moreover, the MFP may access sites (cloud servers) that provide various services (such as OCR services and/or translation services), and use the processing results of the services. For example, there is a technology and the like that transmit a scanned image generated by the MFP to a site that provides OCR services, receive an OCR processing result from the website, and create an electronic document embedded with character information based on the OCR processing result. Such service providing sites include those which provide their services on a chargeable basis. From the point of charging management such as in-house management, it may be desired to narrow websites to be used to only specific websites in order, for example, to prevent charging management target sites from reaching to a large number. As described above, from the point of security, it may also be desired to narrow down to part of the service providing sites.

In this manner, it may be desired in an MFP having the web browser function to narrow its access target websites.

JP 2003-186842 A describes a technology for restricting access to sites on the Internet to only part of the sites (access permitted sites), which is not a technology related to an image forming apparatus but a technology related to a mobile phone.

In an MFP having the web browser function, if the access permitted sites (websites that the MFP is permitted access) are restricted to part of sites, a user may want to change the restriction (for example, want to change part of the restriction settings). For example, the user may also make a request to access a website that has already been judged to be secure but has not yet been registered as the permitted website.

In such a case, it is conceivable that the user requests an administrator by telephone or electronic mail to make a change to a setting that allows access to the desired website (the unregistered website) by, for example, adding the desired website to the permitted sites. The setting change (restriction change) is made by the administrator who has been requested.

However, the processing of the request made by telephone and the like is complicated for the user. Specifically, the user checks who the administrator of the MFP is, contact information (for example, a telephone number or electronic mail address) of the administrator, and the like, contacts the administrator, and conveys a URL (Uniform Resource Locator) of the desired website to the administrator, orally or by describing the URL in an electronic mail.

SUMMARY OF THE INVENTION

An object of the present invention is to provide a technology that can request an administrator relatively easily to make a setting change to a setting that permits an image forming apparatus to access a specific website.

To achieve the abovementioned object, according to an aspect, a communication system reflecting one aspect of the present invention comprises: an image forming apparatus including a browser function and being configured to set permission/non-permission for access according to a website being a communication destination; and a setting change apparatus configured to communicate with the image forming apparatus and be capable of changing a setting of the image forming apparatus in accordance with an operation of an administrator of the image forming apparatus, wherein the image forming apparatus includes a detection unit configured to detect that the image forming apparatus is not allowed to access a specific website, an acquisition unit configured to automatically acquire access destination information of the specific website, identification information of the image forming apparatus, and contact information being contact information of the administrator of the image forming apparatus in an event of the detection that the image forming apparatus is not allowed to access the specific website, and a change request unit configured to transmit a request to change the setting to a setting that permits the image forming apparatus to access the specific website, to the administrator via a network, based on the access destination information of the specific website, the identification information of the image forming apparatus, and the contact information of the administrator, which are acquired by the acquisition unit.

According to an invention of Item. 2, in the communication system of Item. 1, the image forming apparatus preferably further includes a generation unit configured to generate a request screen for making a request to the administrator for a change in the setting related to access to the specific website, the request screen including the access destination information of the specific website, based on the access destination information acquired by the acquisition unit, in an event of the detection that the image forming apparatus is not allowed to access the specific website, and an operating unit configured to display the request screen and accept an instruction to execute the setting change request, and the change request unit preferably transmits the setting change request to the administrator upon the execution instruction being accepted through the request screen.

According to an invention of Item. 3, in the communication system of Item. 1 or 2, the change request unit preferably transmits an electronic mail including the setting change request to an electronic mail address of the administrator.

According to an invention of Item. 4, in the communication system of Item. 1 or 2, the change request unit preferably transmits the setting change request to change request receipt purpose application software running on the setting change apparatus.

According to an invention of Item. 5, in the communication system of any one of Items. 1 to 4, the image forming apparatus preferably further includes a result receiving unit configured to receive one of a completion notice to the effect that a setting change process based on the setting change request is complete and a non-permission notice to the effect that the setting change in accordance with the setting change request is not permitted According to an invention of Item. 6, in the communication system of Item. 5, the change request unit preferably transmits the setting change request to the administrator again upon the one of the notices being not yet received after a lapse of a fixed time since the setting change request is transmitted to the administrator via a network.

According to an invention of Item. 7, in the communication system of Item. 5 or 6, the setting change apparatus preferably decides which of the completion notice and the non-permission notice is appropriate to transmit as the one of the notices in accordance with operation input from the administrator, and acquires a login status of an applicant of the setting change request in the image forming apparatus, upon the applicant of the setting change request being logging in to the image forming apparatus, transmits the one of the notices to the image forming apparatus and displays the one of the notices on a display unit of the image forming apparatus, and upon the applicant being not logging in to the image forming apparatus, transmits an electronic mail illustrating the one of the notices to the applicant.

According to an invention of Item. 8, in the communication system of any one of Items. 1 to 6, the change request unit preferably transmits a request to change the setting to a setting that permits an image forming apparatus group including the image forming apparatus to access the specific website, to the administrator via a network, in an event of the detection that the image forming apparatus is not allowed to access the specific website.

According to an invention of Item. 9, in the communication system of any one of Items. 1 to 8, the image forming apparatus preferably further includes a storage unit configured to store a setting table capable of setting permission/non-permission for access according to the website, and the setting table is preferably changeable at an instruction of the setting change apparatus.

According to an invention of Item. 10, in the communication system of Item. 9, the setting table is preferably capable of adding and registering a website, access to which is permitted, at an instruction of the setting change apparatus.

According to an invention of Item. 11, in the communication system of Item. 9, the setting table is preferably capable of setting security according to the website, and is preferably capable of changing the security setting at an instruction of the setting change apparatus.

To achieve the abovementioned object, according to an aspect, an image forming apparatus including a browser function, reflecting one aspect of the present invention comprises: a detection unit configured to detect that the image forming apparatus is not allowed to access a specific website, an acquisition unit configured to automatically acquire access destination information of the specific website, identification information of the image forming apparatus, and contact information being contact information of an administrator of the image forming apparatus in an event of the detection that the image forming apparatus is not allowed to access the specific website, and a change request unit configured to transmit a setting change request to the effect that it is appropriate to change a setting related to permission/non-permission for access to the specific website to a content that permits the image forming apparatus to access the specific website, to the administrator via a network, based on the access destination information of the specific website, the identification information of the image forming apparatus, and the contact information of the administrator, which are acquired by the acquisition unit.

According to an invention of Item. 13, in the image forming apparatus of Item. 12, the image forming apparatus preferably further comprises: a generation unit configured to generate a request screen for making a request to the administrator for a change in the setting related to access to the specific website, the request screen including the access destination information of the specific website, based on the access destination information acquired by the acquisition unit, in an event of the detection that the image forming apparatus is not allowed to access the specific website; and an operating unit configured to display the request screen and accept an instruction to execute the setting change request, the change request unit preferably transmits the setting change request to the administrator upon the execution instruction being accepted through the request screen.

According to an invention of Item. 14, in the image forming apparatus of Item. 12 or 13, the change request unit preferably transmits an electronic mail including the setting change request to an electronic mail address of the administrator.

According to an invention of Item. 15, in the image forming apparatus of Item. 12 or 13, the change request unit preferably transmits the setting change request to change request receipt purpose application software running on a computer of the administrator.

According to an invention of Item. 16, in the image forming apparatus of any one of Items. 12 to 15, the image forming apparatus preferably further comprises a result receiving unit configured to receive one of a completion notice to the effect that a setting change process based on the setting change request is complete and a non-permission notice to the effect that the setting change in accordance with the setting change request is not permitted.

According to an invention of Item. 17, in the image forming apparatus of Item. 16, the change request unit preferably transmits the setting change request to the administrator again upon the one of the notices being not yet received after a lapse of a fixed time since the setting change request is transmitted to the administrator via a network According to an invention of Item. 18, in the image forming apparatus of any one of Items. 12 to 17, the change request unit preferably transmits a request to change the setting to a setting that permits an image forming apparatus group including the image forming apparatus to access the specific website, to the administrator via a network, in an event of the detection that the image forming apparatus is not allowed to access the specific website.

According to an invention of Item. 19, in the image forming apparatus of any one of Items. 12 to 18, the image forming apparatus preferably further comprises: a storage unit configured to store a setting table capable of setting permission/non-permission for access according to the website, and the setting table is preferably changeable at an instruction of the setting change apparatus.

According to an invention of Item. 20, in the image forming apparatus of Item. 19, the setting table is preferably capable of adding and registering a website, access to which is permitted, at an instruction of the setting change apparatus According to an invention of Item. 21, in the image forming apparatus of Item. 19, the setting table is preferably capable of setting security according to the website, and is preferably capable of changing the security setting at an instruction of the setting change apparatus.

To achieve the abovementioned object, according to an aspect, a non-transitory recording medium storing a computer readable program reflecting one aspect of the present invention causes a computer incorporated in an image forming apparatus including a browser function to execute: a) detecting that the image forming apparatus is not allowed to access a specific website; b) automatically acquiring access destination information of the specific website, identification information of the image forming apparatus, and contact information being contact information of an administrator of the image forming apparatus in an event of the detection that the image forming apparatus is not allowed to access the specific website; and c) transmitting a setting change request to the effect that it is appropriate to change a setting related to permission/non-permission for access to the specific website to a content that permits the image forming apparatus to access the specific website, to the administrator via a network, based on the access destination information of the specific website, the identification information of the image forming apparatus, and the contact information of the administrator, which are acquired in the step b).

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a flowchart illustrating the operation of the image forming apparatus;

FIG. 6 is a flowchart illustrating operation by an administrator;

FIG. 7 is a diagram illustrating an access permission application screen;

FIG. 8 is a diagram illustrating an access permission application mail;

FIG. 11 is a diagram illustrating a completion notice screen that notifies the completion of a setting change;

FIG. 12 is a diagram illustrating a non-permission notice screen that notifies non-permission for the setting change.

DESCRIPTION OF THE PREFERRED EMBODIMENTS

Hereinafter, an embodiment of the present invention will be described with reference to the drawings. However, the scope of the invention is not limited to the illustrated examples.

<1. Overview of the System>

Figure 1:
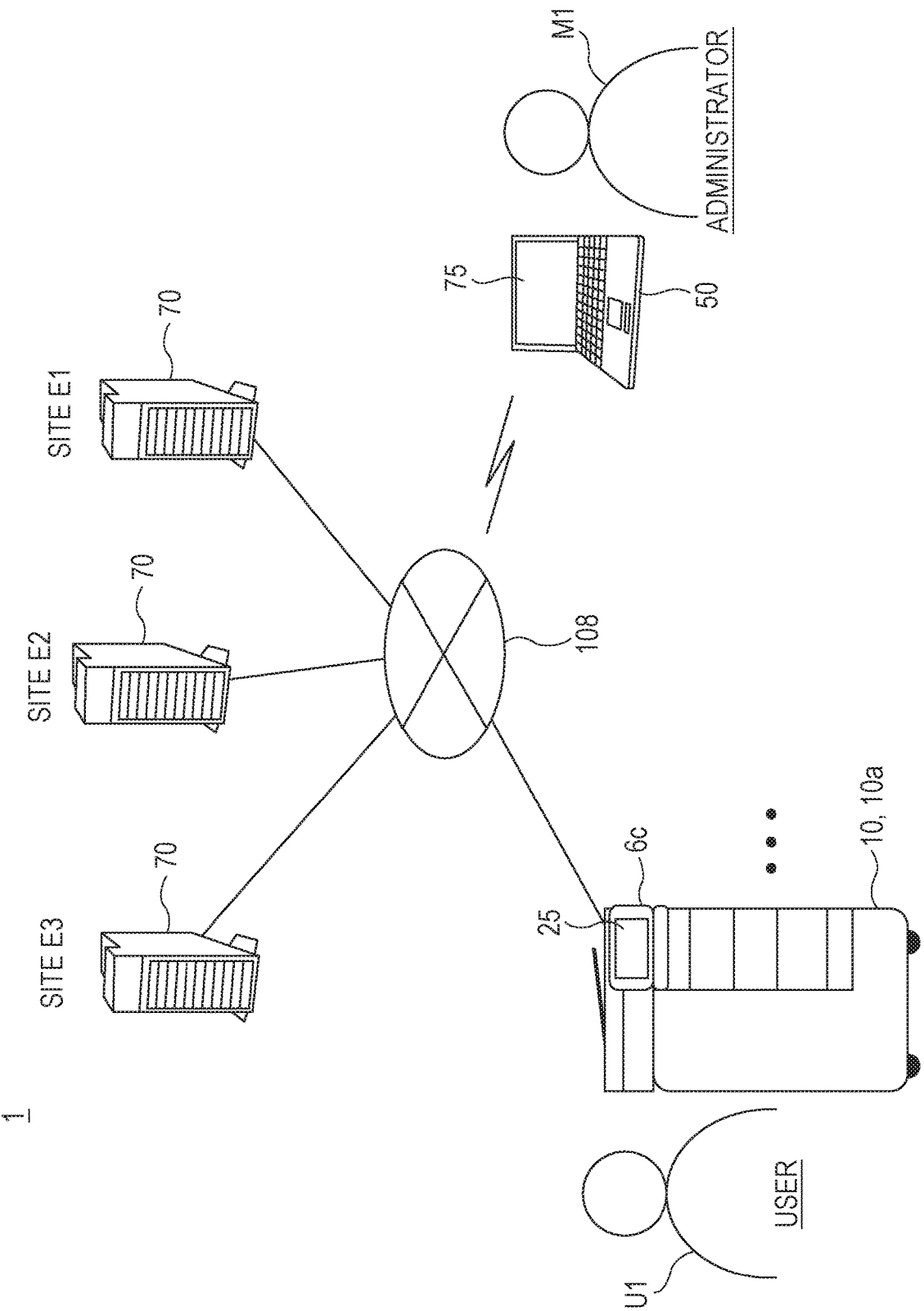
FIG. 1 is a diagram illustrating a schematic configuration of a communication system.

FIG. 1 is a diagram illustrating a communication system 1 according to the embodiment of the present invention. As illustrated in FIG. 1, the communication system 1 includes an image forming apparatus 10 and a setting change apparatus 50 that can change the settings of the image forming apparatus 10. An MFP (Multi-Functional Peripheral) is exemplified as the image forming apparatus 10. In addition, a computer (personal computer) for an administrator is exemplified as the setting change apparatus 50. They are not limited to the MFP and the personal computer. The image forming apparatus 10 may be a single function printer or the like. The setting change apparatus 50 may be a smartphone or the like.

The image forming apparatus 10 and the setting change apparatus 50 are connected to each other via a network (communication network) 108. The network 108 is configured of a LAN (Local Area Network), the Internet, and the like. Moreover, the mode of connection to the network 108 may be wired or wireless connection. For example, the image forming apparatus 10 has a wired connection to the network 108. The setting change apparatus 50 has a wireless connection to the network 108.

The image forming apparatus 10 has an Internet connection function (in more detail, a web browser function). In detail, the image forming apparatus 10 can access various websites (hereinafter also simply referred to as sites) on the Internet by use of the web browser (hereinafter also simply referred to as the browser) function of an application 30 embedded in the image forming apparatus 10.

Moreover, the image forming apparatus 10 can set (change) permission or non-permission for access by network communication through the application 30, according to the website being a communication destination.

Figure 10:
FIG. 10 is a diagram illustrating a setting table in the MFP.

FIG. 10 is a diagram illustrating a setting table 40 that is stored in the MFP 10 (in more detail, a storage unit 5). The setting table 40 is a data table that specifies permission or non-permission for the access of the MFP 10 to each site. In the upper part of FIG. 10, the setting table 40 before a setting change request made by the MFP 10 (that is, an applicant U1 of the setting change request) is illustrated. In the lower part (the lower part than a hollow arrow of FIG. 10, the setting table 40 after the setting change request is illustrated.

In the setting table 40, "access permitted sites" (that is, access permitted contents) are registered. Access to sites that are registered as the access permitted sites is permitted in principle. On the other hand, access to sites other than the sites that are registered as the access permitted sites is prohibited.

As illustrated in the setting table 40 in the upper part of FIG. 10, assume that before the setting change request by the MFP 10 (the applicant U1), access to a site E1 is not permitted (is prohibited) and access to different sites E2 and E3 is permitted.

Moreover, permission/non-permission for the use of each security protocol can be set according to the access destination in the setting table 40 in the MFP 10. For example, as illustrated in the table in the upper part of FIG. 10, the use of a specific security protocol (for example, TLS 1.1) is permitted to the site E2. On the other hand, the use of no security protocols (such as TLS 1.1) is permitted to the other site E3. Moreover, the use of security protocols (for example, TLS 1.3) other than the specific security protocol (for example, TLS 1.1) is not permitted to the site E2.

As described below, a change in the setting content of the setting table 40 makes it possible to change permission/non-permission for access to a specific site.

<2. Configuration of the Image Forming Apparatus 10>

Figure 2:
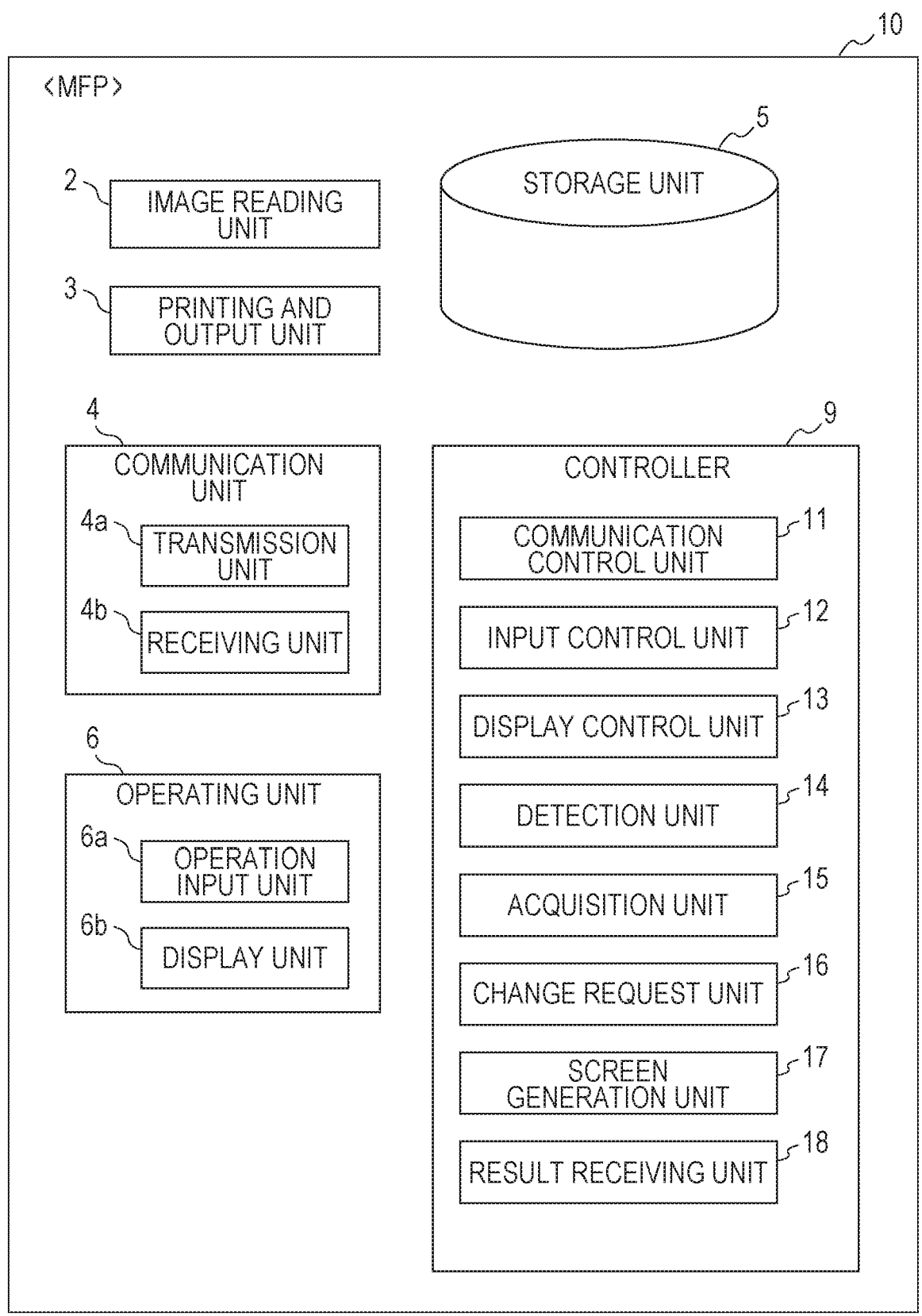
FIG. 2 is a diagram illustrating function blocks of an image forming apparatus.

FIG. 2 is a diagram illustrating function blocks of the image forming apparatus 10. An MFP (Multi-Functional Peripheral) is exemplified as the image forming apparatus 10. FIG. 2 illustrates the function blocks of the MFP 10.

The MFP 10 is an apparatus including a scanning function, a copy function, a facsimile function, and a box storage function (also referred to as a Multi-Function Device). Specifically, the MFP 10 includes an image reading unit 2, a printing and output unit 3, a communication unit 4, the storage unit 5, an operating unit 6, and a controller 9 as illustrated in the function block diagram of FIG. 2. The MFP 10 operates these units in an integrated manner to achieve various functions.

The image reading unit 2 is a processing unit that optically reads (that is, scans) a document placed at a predetermined position of the MFP 10 and generates image data of the document (also referred to as a document image or scanned image). The image reading unit 2 is also referred to as a scanning unit.

The printing and output unit 3 is an output unit that prints images on various media such as paper based on data on a print target, and outputs them.

The communication unit 4 is a processing unit that can perform facsimile communication via a public line or the like. Furthermore, the communication unit 4 can also perform network communication via the network 108. In the network communication, various protocols such as TCP/IP (Transmission Control Protocol/Internet Protocol) are used. The network communication is used to enable the MFP 10 to exchange various kinds of data with a desired destination (for example, the computer 50). The communication unit 4 includes a transmission unit 4a that transmits various kinds of data and a receiving unit 4b that receives various kinds of data.

The storage unit (memory unit) 5 is configured of a storage device such as a hard disk drive (HDD).

The operating unit 6 includes an operation input unit 6a that accepts operation input into the MFP 10, and a display unit 6b that displays and outputs various kinds of information.

The MFP 10 is provided with a substantially plate-shaped operation panel unit 6c (refer to FIG. 1). Moreover, the operation panel unit 6c includes a touchscreen 25 (refer to FIG. 1) on its front side. The touchscreen 25 also functions as part of the operation input unit 6a and also functions as part of the display unit 6b. The touchscreen 25 is configured by embedding various sensors and the like in a liquid crystal display panel. The touchscreen 25 can display various kinds of information and also accept various kinds of operation input from an operator.

The controller 9 is a control device that is embedded in the MFP 10 and controls the MFP 10 integrally. The controller 9 is configured as a computer system including a CPU and various semiconductor memories (a RAM and a ROM). The controller 9 executes, in the CPU, a predetermined software program (hereinafter also simply referred to as a program) stored in the ROM (for example, an EEPROM) to realize various processing units. The program is simply required to be recorded in, for example, various portable recording media (such as a USB flash drive) and installed in the MFP 10 via the recording media. Alternatively, the program may be downloaded via the network 108 and the like and installed in the MFP 10.

Specifically, as illustrated in FIG. 2, the controller 9 executes the program to realize various processing units including a communication control unit 11, an input control unit 12, a display control unit 13, a detection unit 14, an acquisition unit 15, a change request unit 16, a screen generation unit 17, and a result receiving unit 18.

The communication control unit 11 is a processing unit that controls the operation of communication with another apparatus (such as the computer 50) in cooperation with the communication unit 4 and the like. The communication control unit 11 includes a transmission control unit that controls the operation of transmission of various kinds of data and a receiving control unit that controls the operation of receipt of various kinds of data.

The input control unit 12 is a control unit that controls the operation of operation input into the operation input unit 6a (such as the touchscreen 25). For example, the input control unit 12 controls the operation of accepting operation input (such as specified input from the user) on an operation screen displayed on the touchscreen 25.

The display control unit 13 is a processing unit that controls the operation of display on the display unit 6b (such as the touchscreen 25).

The detection unit 14 is a processing unit that detects that the MFP 10 cannot access a specific website. Specifically, access to a specific website is attempted in access processing using the application (browser) 30 described below. If the specific website cannot be accessed, the detection unit 14 detects it.

The acquisition unit 15 is a processing unit that acquires access destination information of the specific website that could not be accessed (a URL (Uniform Resource Locator) of the specific website) and the like. The acquisition unit 15 also acquires identification information of the MFP 10, contact information of an administrator of the MFP 10 (contact information), and the like.

The change request unit 16 is a processing unit that, if inaccessibility to the specific website is detected, transmits a request to change the setting to a setting that permits the MFP 10 to access the specific website, to the administrator via the network. The setting change request is also expressed as a request to the effect that the setting related to permission/non-permission for access to the specific website (the setting of the MFP 10) needs be changed to the setting (setting content) that permits the MFP 10 to access the specific website. Permission or non-permission for access is finally determined by the administrator of the MFP 10 based on the setting change request in view of various circumstances. A setting change process for the MFP 10 is performed by the administrator (which is described below).

The screen generation unit 17 executes, for example, a process of creating a request screen for requesting the administrator to change the setting related to access to the specific website (a setting change request screen) (refer to FIG. 7).

The result receiving unit 18 is a processing unit that receives the process result of the setting change request (specifically, a completion notice to the effect that the setting change process based on the setting change request is complete, a non-permission notice to the effect that the setting change in accordance with the setting change request is not permitted, or the like).

Programs installed in the MFP 10 include the application software program (hereinafter also simply referred to as the application) 30. The application 30 uses its own browsing function to enable access to various websites on the Internet.

<3. Configuration of the Computer for the Administrator>

Next, the configuration of the setting change apparatus 50 is described.

The setting change apparatus 50 is an information input/output terminal apparatus that can perform network communication with the MFP 10 and the like. A personal computer is exemplified as the setting change apparatus 50. However, the setting change apparatus 50 is not limited to the personal computer and may be a smartphone or the like. The setting change apparatus 50 may be a mobile apparatus (such as a mobile information terminal) or a stationary apparatus.

Figure 3:
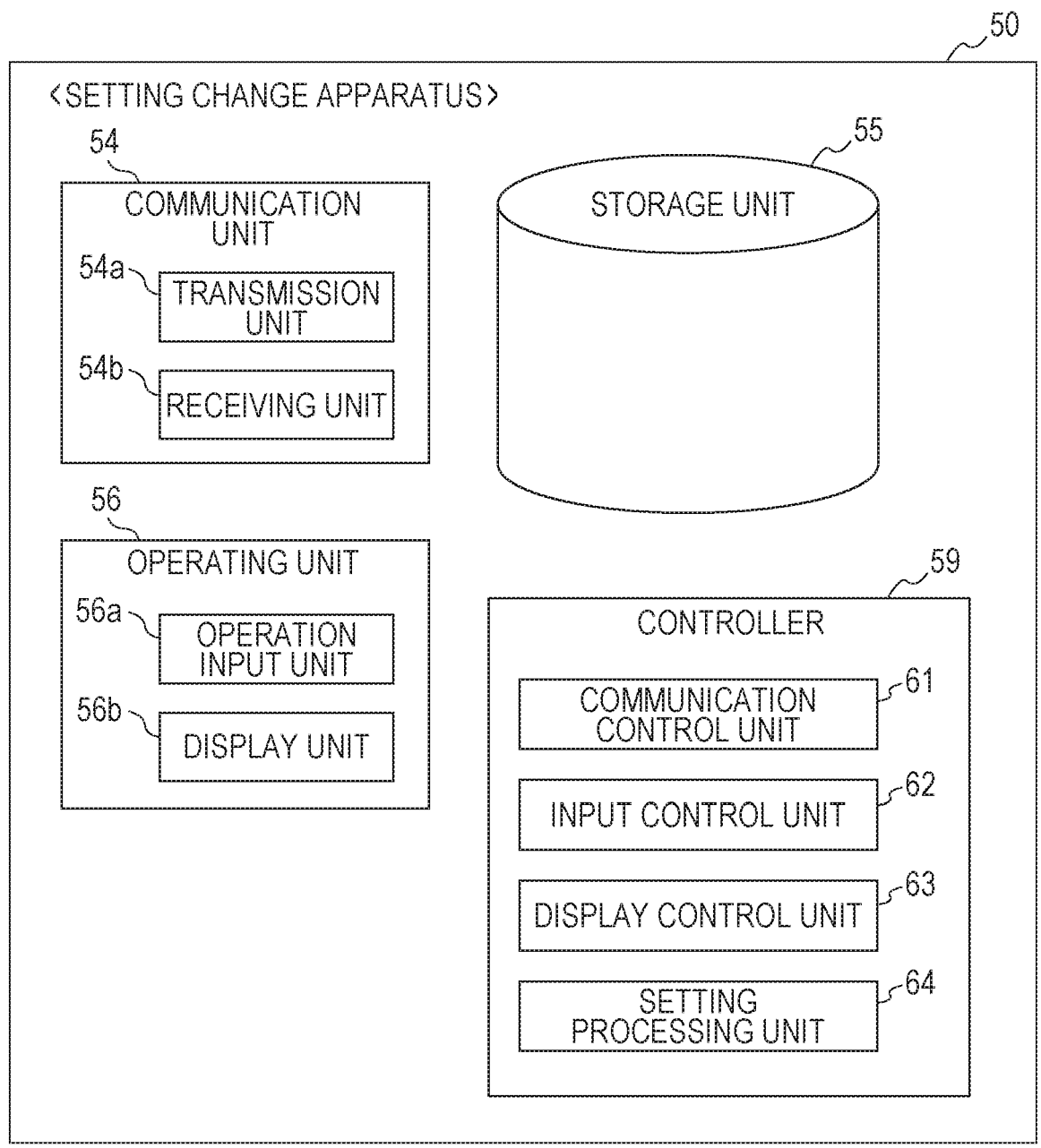
FIG. 3 is a diagram illustrating function blocks of a setting change apparatus.

FIG. 3 is a function block diagram illustrating a schematic configuration of the setting change apparatus 50.

The setting change apparatus 50 includes a communication unit 54, a storage unit 55, an operating unit 56, and a controller 59 as illustrated in the function block diagram of FIG. 3. The setting change apparatus 50 operates these units in an integrated manner to achieve various functions.

The communication unit 54 can perform network communication via the network 108. In the network communication, various protocols such as TCP/IP (Transmission Control Protocol/Internet Protocol) are used. The setting change apparatus 50 uses the network communication to enable exchanges of various kinds of data with a desired destination (such as the MFP 10). The communication unit 54 includes a transmission unit 54a that transmits various kinds of data and a receiving unit 54b that receives various kinds of data.

The storage unit 55 is configured of a storage device such as a nonvolatile semiconductor memory.

The operating unit 56 includes an operation input unit 56a that accepts operation input into the setting change apparatus 50, and a display unit 56b that displays and outputs various kinds of information. The setting change apparatus 50 is provided with a touchscreen 75 (refer to FIG. 1) configured by embedding various sensors and the like in a liquid crystal display panel. The touchscreen 75 also functions as part of the operation input unit 56a and also functions as part of the display unit 56b.

The controller 59 of FIG. 3 is a control device that is embedded in the setting change apparatus 50 and integrally controls the setting change apparatus 50. The controller 59 includes a CPU and various semiconductor memories (a RAM and a ROM). The configuration including the controller 59 functions as a computer system. The controller 59 executes, in the CPU, a predetermined software program (such as a setting change purpose program) stored in a storage unit (such as a semiconductor memory) to realize various processing units. The program is simply required to be recorded in, for example, various portable recording media (such as a USB flash drive) and installed in the setting change apparatus 50 via the recording media. Alternatively, the program may be downloaded via the network 108 and the like, and installed in the setting change apparatus 50.

Specifically, the controller 59 executes the program and the like to realize various processing units including a communication control unit 61, an input control unit 62, a display control unit 63, and a setting processing unit 64.

The communication control unit 61 is a processing unit that controls the operation of communication with the MFP 10 and the like in corporation with the communication unit 54 and the like.

The input control unit 62 is a control unit that controls the operation of operation input into the operation input unit 56a (such as the touchscreen 75).

The display control unit 63 is a processing unit that controls the operation of display on the display unit 56b (such as the touchscreen 75).

The setting processing unit 64 is a processing unit that communicates with the MFP 10 in corporation with the communication control unit 61 and the like and, for example, makes various setting changes in the MFP 10. Specifically, the changed setting content is set in the MFP 10 in accordance with the user's operation (an operation by the administrator of the MFP 10) through an appropriate setting change purpose screen.

<4. Operation>

<4.1 Setting Change Request>

Figure 4:
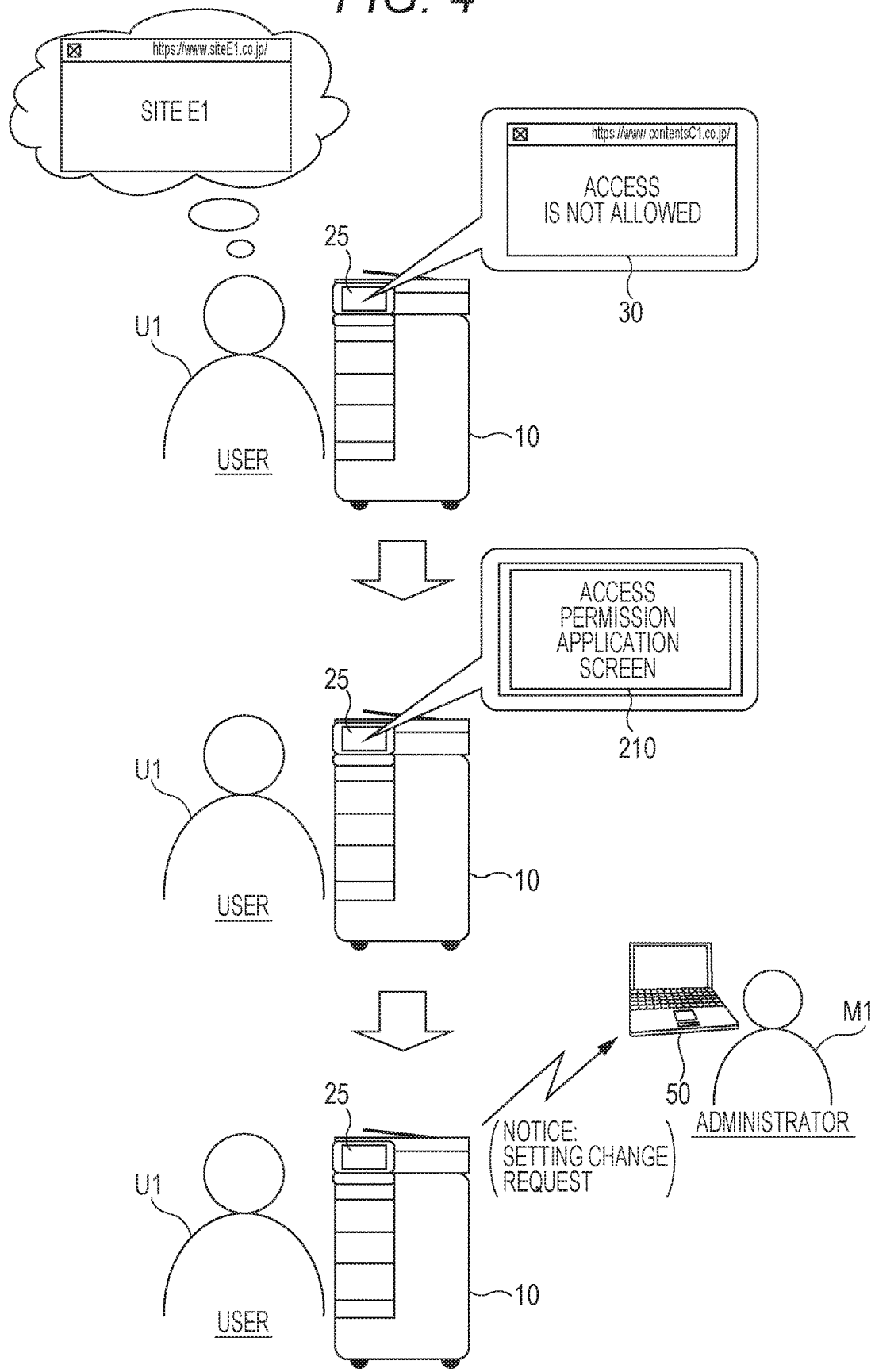
FIG. 4 is a conceptual diagram illustrating the operation of the system.

FIG. 4 is a conceptual diagram illustrating the operation of the system 1. FIG. 5 is a flowchart illustrating the operation of the MFP 10. The operation of the system 1 is described hereinafter with reference to these drawings.

Firstly, the user U1 of the MFP 10 (the user of the MFP 10) logs in to the MFP 10 and then performs a predetermined operation on the touchscreen 25 of the MFP 10 to activate the application (with the browser function) 30 of the MFP 10. The user U1 then gives the application 30 an access instruction where a URL of the desired website E1 is specified.

The application 30 follows the access instruction, and attempts access to the site E1 using the browser function of the application 30.

Specifically, firstly, the application 30 follows the access instruction and attempts a negotiation with the site E1 at the start of communication with the site E1. Specifically, the negotiation is successful on condition that a security protocol (for example, TLS (Transport Layer Security) 1.3) required by the site E1 agrees with a security protocol granted use permission in the MFP 10. If the negotiation is successful, then the MFP 10 refers to the setting table 40 (the data table where permitted sites are set (registered)) set in the MFP 10 itself to check whether or not the site E1 specified by the access instruction is registered as the access permitted site in the setting table 40. If the site E1 is already registered as the access permitted site, access to the site E1 starts. In addition to TLS 1.3, TLS 1.1, TLS 1.0, SSL (Secure Sockets Layer) 2.0, SSL3.0, and the like are exemplified as a security protocol required by each site.

Upon such an attempt to access, a situation where the MFP 10 cannot access the website can occur due to various reasons. For example, if the security protocol (such as TLS 1.3) required by the site E1 does not agree with the security protocol (such as TLS 1.1) granted use permission in the MFP 10, the negotiation fails. The site E1 rejects communication. In this case, the MFP 10 cannot access the site E1. Moreover, also if the desired site E1 is not registered as the access permitted site in the setting table 40, the MFP 10 cannot access the site E1.

The detection unit 14 of the MFP 10 detects the occurrence of an event where access to the specific website E1 is not possible, when access to the website E1 failed. It is simply required to detect that the MFP 10 cannot access to the specific website E1. It is not required to identify the reason (cause) of inaccessibility to the specific website E1.

If the detection unit 14 of the MFP 10 detects the occurrence of the event (the MFP 10's inaccessibility to the specific website E1), the MFP 10 displays it (inaccessibility to the specific website E1) on the touchscreen 25 (refer to the topmost part of FIG. 4). The processing proceeds from Step S11 to Step S12. On the other hand, if the event is not detected, the process of FIG. 5 ends without proceeding to Step S12.

Also if the network communication itself is shut down, the MFP 10 fails to access the specific website. Also if the network communication itself is shut down in Step S11, it is simply required to detect the occurrence of the event where "access to the specific website E1 is not possible". However, the process is not limited to this. If the network itself is shut down, it may be set such that the MFP 10 determines the blockage (shutdown) of the network and also does not proceed to Step S12 (ends the process of FIG. 5) exceptionally. In other words, it may be set such that the MFP 10 does not detect the occurrence of the event exceptionally if the Internet connection itself is shut down. In this manner, it may be set such that the occurrence of the event is detected only if access to the website E1 fails regardless of the fact that the Internet connection itself (the network communication itself) is operating normally.

In Step S12, the MFP 10 acquires and retains in advance access destination information of the specific website E1 that is not permitted access (the URL of the site E1) and its own identification information (such as apparatus name, apparatus ID, and MAC address (Media Access Control address)). Furthermore, the MFP 10 also acquires and retains in advance information on the administrator of the MFP 10 (administrator information) (administrator name and contact information of the administrator (such as email address)) and user information (such as user name and user ID) of the user who is currently logging in. For example, the administrator information is previously stored in the storage unit 5 of the MFP 10, and acquired by being extracted from the storage unit 5.

In Step S13, the MFP 10 displays an access permission application screen 210 (a setting change request screen for requesting a setting change to a setting that permits specific access) (refer to FIG. 7) on the touchscreen 25, and accepts an instruction to request the setting change. In the embodiment, the access permission application screen 210 is used to enable the acceptance of the application of access permission (a request to change the setting to a setting that permits the MFP 10 to access the specific website).

The access permission application screen 210 includes a plurality of (five herein) items: "application target site (a target site for which access permission is requested)," "applicant (requestor)," "applicant's email address," "applying apparatus (requesting apparatus)," and "reasons for application."

Each piece of information acquired in Step S12 is (input and) displayed in four of the five items. Specifically, the URL "https://www.siteE1.co.jp/" of the site E1 is displayed in the item "application target site." Moreover, a user name "user U1" of the user U1 is displayed in the item "applicant." An email address "userU1@aaa.com" of the user U1 is displayed in the item "applicant's email address." Furthermore, a name "MFP No. 1" of the applying apparatus (the MFP 10) is displayed in the item "applying apparatus."

Moreover, one item "reasons for application" of the five items is blank at the start of display, and filled in by the user's input operation. FIG. 7 illustrates a state after the user has input the words "business necessity."

In Step S14, the MFP 10 determines whether or not to execute the application.

If the user does not have the intention to apply for access permission of the site E1, the user presses a cancel button on the access permission application screen 210. In this case, the MFP 10 determines that access permission application has not been requested (and the application is not executed), and ends the process of FIG. 5 (without proceeding to Step S15).

On the other hand, if having the intention to apply for access permission of the site E1, the user presses an OK button on the access permission application screen 210. Specifically, after completing filling in the access permission application screen 210, the user checks the contents of the items on the access permission application screen 210, and presses the OK button. In this case, the MFP 10 determines that access permission application has been requested by the user (and the application is executed), and proceeds from Step S14 to Step S15.

In Step S15, the MFP 10 transmits (notifies) the access permission application (a setting change request for the website E1) to the administrator via the network. Specifically, the MFP 10 transmits an electronic mail (access permission application mail) 220 (refer to FIG. 8) including the application contents of the access permission application (such as the contents of the items of FIG. 7) to an email address of the administrator. The one acquired in Step S12 is used as the email address of the administrator.

As illustrated in FIG. 8, the access permission application mail (also referred to as the setting change request mail) 220 contains information on a plurality of items such as "application target site," "applicant," "applicant's email address," "applying apparatus," and "reasons for application." As these pieces of information, the information acquired in Step S12 and the information input on the access permission application screen 210 is used.

For example, as the information on the item "reasons for application," the information input by the user U1 on the access permission application screen 210 is used. As the information on the item "application target site" (such as a URL of a target for permission), the information acquired in Step S12 is used. Moreover, as the information on the item "applying apparatus," the information acquired in Step S12 (the identification information (such as apparatus name and MAC address) of the MFP 10) is used. The same applies to the other items.

As described above, the MFP 10 (in detail, 10a) notifies an administrator M1 access permission application and applies to the administrator M1 for access permission.

<4.2 Setting Changes, Etc. By the Administrator>

When having received (received) notice of access permission application (for example, the access permission application mail), the administrator M1 activates an application 60 (a setting change purpose application) installed in the setting change apparatus 50. The embodiment is not limited to this. The setting change purpose application may always be active.

FIG. 6 is a flowchart illustrating operation and the like by the administrator M1.

As illustrated in FIG. 6, firstly, the administrator M1 decides whether or not to permit access to a site related to the notice.

If having judged that it is appropriate to permit the access (YES in Step S31), the administrator M1 proceeds to Step S32.

Figure 9:
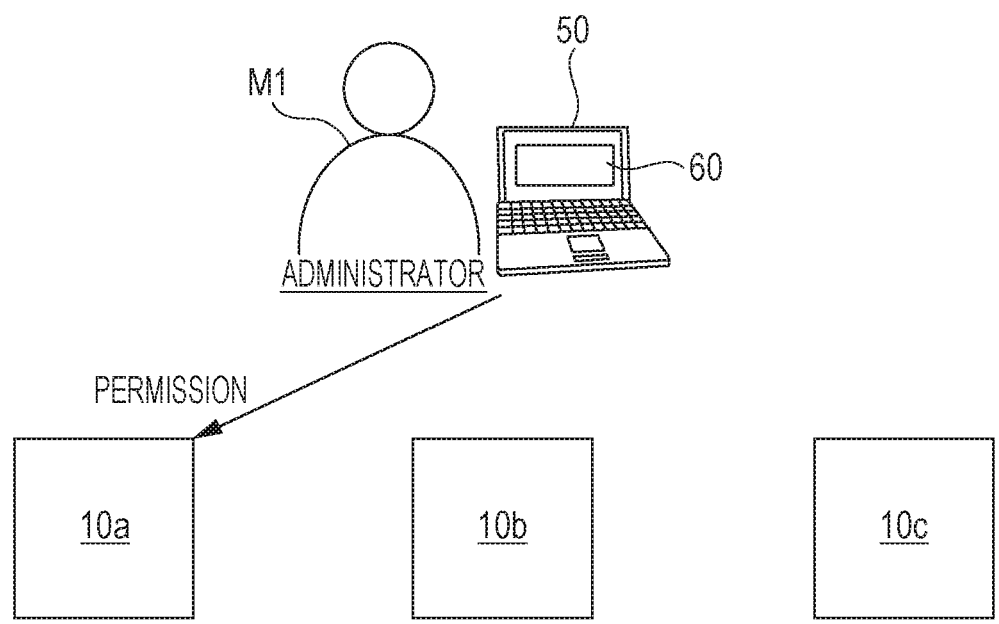
FIG. 9 is a diagram illustrating a state where an access permission process (setting change process) is performed only on a requesting MFP.

In Step S32, the administrator M1 uses the setting change purpose application 60 to perform an access permission process (the setting change process) related to the MFP 10 (10a) (Step S32) (refer to FIG. 9). In other words, a change instruction in accordance with the operation of the administrator M1 is transmitted from the setting change apparatus 50 (the setting change purpose application 60) to the MFP 10. The contents of the setting table 40 are changed in accordance with the change instruction. In more detail, when the administrator M1 has selected a predetermined menu item (a "setting change" menu) in the setting change purpose application 60, the setting change apparatus 50 (the setting change purpose application 60) communicates with the MFP 10 (10a) to change the security setting content (registered content) in the MFP 10.

For example, if the site E1 has not yet been registered in the setting table 40 (refer to the upper part than the white arrow of FIG. 10) of the MFP 10, the administrator M1 uses the setting change purpose application 60 to add and register the site E1 as the access permitted site in the setting table 40 (refer to the lower part than the white arrow of FIG. 10). Furthermore, the administrator M1 checks the security protocol (for example, TLS 1.3) required by the site E1 to check whether or not the security protocol is set in the MFP 10. If the security protocol required by the site E1 has not yet been set in the MFP 10, the administrator M1 uses the setting change purpose application 60 and sets, in the MFP 10, use permission for the security protocol (for example, TLS 1.3) required by the site E1. Information to the effect that the use of the security protocol (for example, TLS 1.3) is permitted to only access to the site E1 is set in the setting table 40. The use of the security protocol (for example, TLS 1.3) is not permitted to access to sites other than the site E1. Consequently, a change in the security protocol settings can be reduced to a minimum. In other words, it is possible to make only a setting change related to the site and have no influence on access to other sites. However, the embodiment is not limited to this. It may be set such that the use of the security protocol (for example, TLS 1.3) is permitted to all access destinations without depending on an access target site (URL).

After such an access permission process (an access permitted site addition process and/or a security protocol change process) is performed, the administrator M1 transmits a registration completion mail to the applicant (the user U1) and notifies the applicant (the user U1) of the completion of the setting change (Step S33). In other words, the administrator M1 transmits the completion notice to the effect that the setting change process based on the setting change request is complete (a setting completion notice), to the user U1 by electronic mail.

When having received the setting completion notice from the administrator M1, the user U1 (the applicant) becomes aware of the completion of the setting, and uses the application 30 again to give the application 30 an access instruction where the URL of the desired website E1 is specified. The application 30 follows the access instruction and attempts access to the site E1. If the setting change process has been performed appropriately, access to the site E1 succeeds.

On the other hand, if having judged that it is inappropriate to permit the access (NO in Step S31), the administrator M1 proceeds from Step S31 to Step S34. In Step S34, the administrator M1 transmits a registration non-permission mail to the applicant U1, and notifies the applicant U1 of non-permission for registration (non-permission for the setting change). In other words, the administrator M1 transmits the non-permission notice to the effect that the setting change in accordance with the setting change request is not permitted (a setting non-permission notice), to the user U1 by electronic mail.

When having received the setting non-permission notice from the administrator M1, the user U1 (the applicant) checks the reasons and the like described in the setting non-permission notice. The user U1 can notify the administrator M1 of access permission application (for example, the reasons for application are rewritten in detail) to apply for access permission again through a similar process to that of FIG. 5, depending on the validity and the like of the reasons.

In the above operation, if the MFP 10 detects that access to the specific site E1 is not possible, the MFP 10 automatically acquires the access destination information of the specific site E1, the identification information of the MFP 10, and the contact information of the administrator in the MFP 10 (Step S12). The setting change request screen containing the access destination information of the specific site E1 is displayed. The setting change request screen is used to accept a request instruction (an instruction to execute a setting change request) (Step S13). The MFP 10 then transmits the request to change the setting to a setting that permits access to the specific site E1 to the administrator via the network, based on the access destination information of the site E1, the identification information of the MFP 10, and the contact information of the administrator (Step S15). In more detail, an electronic mail for the setting change request is automatically generated based on these pieces of information to be transmitted to the administrator, which saves the applicant U1 the trouble of being required complicated operations such as finding and inputting the access destination information of the site E1, the identification information of the MFP 10, and the contact information of the administrator. Accordingly, it is possible to very easily request the administrator to change the setting.

<5. Modifications, Etc.>

Up to this point the embodiment of the present invention has been described. However, the present invention is not limited to the contents described above.

For example, in the above embodiment, negotiation and the process of referring to the setting table 40 are executed in this order at the start of communication between the MFP 10 (the browser) and each site (a web server). However, the order is not limited to this. They may be executed in the reverse order (specifically, in order of the process of referring to the setting table 40 and negotiation).

Moreover, in the above embodiment, "access permitted sites" are registered in the setting table 40. Access to sites other than the sites registered as the access permitted sites is prohibited. However, the embodiment is not limited to this. For example, it may be set such that "access not-permitted sites" are registered in the setting table 40 and access to the sites registered as the "access not-permitted sites" is prohibited.

Moreover, in the above embodiment, the MFP 10 transmits the setting change request to the administrator M1 by electronic mail (Step S15). However, the embodiment is not limited to this. For example, it may be set such that the MFP 10 transmits the setting change request to the application 60 (also referred to as the change request receiving purpose application) running on the computer (setting change apparatus) 50 of the administrator. It may be set such that the application 60 displays a request receipt screen on the display unit of the setting change apparatus 50 in response to the receipt of the setting change request, and the administrator M1 visually recognizes a notice message on the request receipt screen and accordingly becomes aware of the receipt of the setting change request. The request receipt screen is simply required to have a similar content to, for example, that of the electronic mail of FIG. 8. In such an aspect, for example, identification information (for example, IP address or MAC address) of the computer 50 of the administrator is simply required to be acquired as contact information of the administrator in Step S12. It is simply required that the MFP 10 uses the contact information (the identification information of the computer 50), transmits the setting change request to the computer 50 (the application 60), and notifies the setting change request to the administrator via the computer 50.

Moreover, in the above embodiment, after receiving the setting change request, the administrator M1 transmits (returns) selected one of the completion notice (setting completion notice) and the non-permission notice (setting non-permission notice) to the applicant by electronic mail (in other words, transmits an electronic mail illustrating the one of the notices). However, the embodiment is not limited to this.

For example, the administrator M1 may notify the one of the notices to the applicant U1 through the application 60. In other words, the MFP 10 may receive the completion notice or the non-permission notice from the application 60 running on the computer (setting change apparatus) 50 of the administrator.

In more detail, if the administrator M1 selects one of a completion notice transmission menu and a non-permission notice transmission menu through the application 60, the application 60 is simply required to decide that selected one of the completion notice and the non-permission notice needs to be transmitted in accordance with the selection operation, and also transmit the one of the notices to the applicant U1 by electronic mail. Alternatively, the application 60 may transmit the one of the notices in accordance with the selection operation to the MFP 10 via the network 108 and display the one of the notices on the display unit of the MFP 10. More specifically, the MFP 10 is simply required to display a completion notice screen 230 (refer to FIG. 11) corresponding to the completion notice on the touchscreen 25 when having received the completion notice. Moreover, the MFP 10 is simply required to display a non-permission notice screen 240 (refer to FIG. 12) corresponding to the non-permission notice on the touchscreen 25 when having received the non-permission notice.

Moreover, if one of the notices has been decided to be transmitted, the setting change apparatus 50 (the application 60) may be set in such a manner as to communicate with the MFP 10, acquire the login status of the applicant U1 in the MFP 10 from the MFP 10, and change a notification method in accordance with the login status. Specifically, when the applicant U1 is not logging in (for example, has already logged in) to the image forming apparatus, the application 60 transmits the one of the notices to the applicant U1 by electronic mail. On the other hand, when the applicant U1 is still logging in to the MFP 10, the application 60 transmits the one of the notices to the MFP 10, causes the display unit (such as the touchscreen 25) of the MFP 10 to display it, and notifies the one of the notices to the applicant U1 via the MFP 10. Consequently, especially in cases such as that the applicant U1 is still logging in to and is near the MFP 10, the applicant U1 can become aware relatively early of information such as that access to the specific site E1 becomes possible.

Moreover, in the above embodiment, the "setting change request" is transmitted from the MFP 10 to the administrator M1 only immediately after the OK button on the access permission application screen 210 is pressed (only once) (Step S15). However, the embodiment is not limited to this. Specifically, it may be set such that if the MFP 10 has not yet received the completion notice or non-permission notice after a lapse of a fixed time (for example, one hour) since the "setting change request" was transmitted to the administrator M1 via the network, the MFP 10 transmits the setting change request to the administrator again. Moreover, it may be set such that the MFP 10 repeatedly transmits the setting change request to the administrator at intervals of predetermined time or at irregular intervals until receiving the completion notice or non-permission notice.

Figure 13:
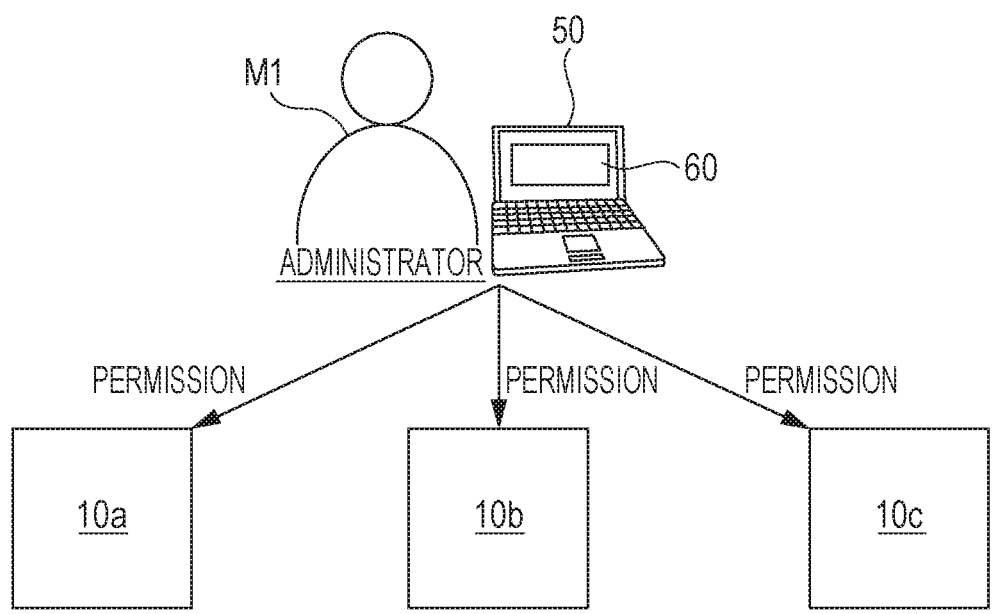
FIG. 13 is a diagram illustrating a state where the access permission process (setting change process) is performed on a plurality of MFPs including the requesting MFP.

Moreover, in the above embodiment, the administrator M1, who has accepted the notice of the setting change request, performs the process of changing the setting to the setting that permits access to the specific site E1 on only the MFP 10 (10*a*) being the requestor. However, the embodiment is not limited to this. For example, as illustrated in FIG. 13, the administrator M1 may perform a similar setting change process (the process of changing the setting to the setting that permits access to the specific site E1) on each of a plurality of the MFPs 10 (10*a*, 10*b*, 10*c*, . . . ) of a group (an image forming apparatus group) to which the MFP 10*a* belongs (based on the administrator M1's own judgment). If a similar setting change process is performed also on MFPs (such as 10*b* and 10*c*) other than the MFP 10*a* based on the administrator's judgment, the user U1 does not need to make setting change requests separately for the other MFPs (such as 10*b* and 10*c*).

Moreover, in the above embodiment, the MFP 10 (10*a*) transmits the setting change request to the effect that a change to the setting that permits access to the specific website E1 is made only for the MFP 10 itself. However, the embodiment is not limited to this. For example, the MFP 10 may transmit a setting change request (an explicit setting change request related to a plurality of MFPs 10) to the effect that a change is made to a setting that permits an MFP group (an image forming apparatus group) including itself to access the specific website E1. In other words, the MFP 10 may request the administrator to make a similar setting change not only for the MFP 10 itself but also for each of a plurality of MFPs 10 of the same group. If the explicit setting change request related to the MFP group is transmitted to the administrator, setting change requests for the other MFPs (such as 10*b* and 10*c*) other than one MFP 10*a* can be made at a time and securely. Therefore, it is possible to avoid a situation where setting change requests are further made separately for the other MFPs (such as 10*b* and 10*c*).

Although the present invention has been described and illustrated in detail, it is clearly understood that the same is by way of illustrated and example only and is not to be taken by way of limitation, the scope of the present invention being interpreted by terms of the appended claims.

What is claimed is:

1. A communication system comprising:
   a multi-function peripheral including a browser function and being configured to set permission/non-permission for access with respect to a website being a communication destination; and
   a setting change apparatus configured to communicate with the multi-function peripheral and to change a setting of the multi-function peripheral in accordance with an operation of an administrator of the multi-function peripheral,
   wherein the multi-function peripheral includes:
   a storage; and a hardware processor that, under control of a stored program, executes processes comprising:

a detection process to detect that the multi-function peripheral is not allowed to access a specific website;

an acquisition process to, in response to the detection process detecting that the multi-function peripheral is not allowed to access the specific website and without requiring action by a user, automatically acquire, from the storage, (i) access destination information of the specific website, (ii) identification information of the multi-function peripheral, (iii) user information, and (iv) contact information of the administrator of the multi-function peripheral;

a generation process to, when the detection process detects that the multi-function peripheral is not allowed to access the specific website, generate a request screen for making a setting change request to the administrator to change the setting to a setting that permits the multi-function peripheral to access the specific website, each piece of information acquired in the acquisition process being input to a respective item included in the request screen, wherein the request screen includes an area for accepting input of information regarding a reason for making the setting change request;

an input control process to display the request screen and accept input of an execution instruction to execute the setting change request through the request screen; and a change request process to, upon the input of the execution instruction being accepted through the request screen, transmit the setting change request to the administrator via a network, based on the access destination information of the specific website, the identification information of the multi-function peripheral, the user information, and the contact information of the administrator, which are acquired in the acquisition process.

2. The communication system according to claim 1, wherein the change request process transmits an electronic mail including the setting change request to an electronic mail address of the administrator.

3. The communication system according to claim 1, wherein the change request process transmits the setting change request to change request receipt purpose application software running on the setting change apparatus.

4. The communication system according to claim 1, wherein the hardware processor, under control of the stored program, further executes a result receiving process to receive one of notices from among (i) a completion notice indicating that a setting change process based on the setting change request is complete and (ii) a non-permission notice indicating that a setting change in accordance with the setting change request is not permitted.

5. The communication system according to claim 1, wherein the change request process transmits a request to change the setting to a setting that permits a multi-function peripheral group including the multi-function peripheral to access the specific website, to the administrator via the network, when the detection process detects that the multi-function peripheral is not allowed to access the specific website.

6. The communication system according to claim 1, wherein:

the storage stores a setting table capable of setting permission/non-permission for access with respect to each of at least one website, and the setting table is changeable according to an instruction of the setting change apparatus.

7. The communication system according to claim 4, wherein the change request process transmits the setting change request to the administrator again when the one of the notices has not yet been received after a fixed time has elapsed since the setting change request was initially transmitted to the administrator.

8. The communication system according to claim 4, wherein the setting change apparatus:

decides which of the completion notice and the non-permission notice is appropriate to transmit as the one of the notices in accordance with an operation input from the administrator, and acquires a login status of an applicant of the setting change request at the multi-function peripheral, upon the applicant of the setting change request being logged in to the multi-function peripheral, transmits the one of the notices to the multi-function peripheral and displays the one of the notices on a display of the multi-function peripheral, and upon the applicant not being logged in to the multifunction peripheral, transmits an electronic mail including the one of the notices to the applicant.

9. The communication system according to claim 6, wherein the setting table is changeable to add and register a website, access to which is permitted, according to an instruction of the setting change apparatus.

10. The communication system according to claim 6, wherein the setting table is further capable of setting a security setting with respect to each of the at least one website, the security setting being changeable according to an instruction of the setting change apparatus.

11. A multi-function peripheral including a browser function, the multi-function peripheral comprising:

a storage; and a hardware processor that, under control of a stored program, executes processes comprising:

a detection process to detect that the multi-function peripheral is not allowed to access a specific website;

an acquisition process to, in response to the detection process detecting that the multi-function peripheral is not allowed to access the specific website and without requiring action by a user, automatically acquire, from the storage, (i) access destination information of the specific website, (ii) identification information of the multi-function peripheral, (iii) user information, and (iv) contact information of an administrator of the multi-function peripheral;

a generation process to, when the detection process detects that the multi-function peripheral is not allowed to access the specific website, generate a request screen for making a setting change request to the administrator to change the setting to a setting that permits the multi-function peripheral to access the specific website, each piece of information acquired in the acquisition process being input to a respective item included in the request screen, wherein the request screen includes an area for accepting input of information regarding a reason for making the setting change request;

an input control process to display the request screen and accept input of an execution instruction to execute the setting change request through the request screen; and a change request process to, upon the input of the execution instruction being accepted through the request screen, transmit the setting change request to the administrator via a network, based on the access destination information of the specific website, the identification information of the multi-function peripheral, the user information, and the contact information of the administrator, which are acquired in the acquisition process.

12. The multi-function peripheral according to claim 11, wherein the change request process transmits an electronic mail including the setting change request to an electronic mail address of the administrator.

13. The multi-function peripheral according to claim 11, wherein the change request process transmits the setting change request to change request receipt purpose application software running on a computer of the administrator.

14. The multi-function peripheral according to claim 11, wherein the hardware processor, under control of the stored program, further executes a result receiving process to receive one of notices from among (i) a completion notice indicating that a setting change process based on the setting change request is complete and (ii) a non-permission notice indicating that a setting change in accordance with the setting change request is not permitted.

15. The multi-function peripheral according to claim 11, wherein the change request process transmits a request to change the setting to a setting that permits a multi-function peripheral group including the multi-function peripheral to access the specific website, to the administrator, when the detection process detects that the multi-function peripheral is not allowed to access the specific website.

16. The multi-function peripheral according to claim 11, wherein:
the storage stores a setting table capable of setting permission/non-permission for access with respect to each of at least one website, and
the setting table is changeable according to an instruction of the setting change apparatus.

17. The multi-function peripheral according to claim 14, wherein the change request process transmits the setting change request to the administrator again when the one of the notices has not yet been received after a fixed time has elapsed since the setting change request was initially transmitted to the administrator.

18. The multi-function peripheral according to claim 16, wherein the setting table is changeable to add and register a website, access to which is permitted, according to an instruction of the setting change apparatus.

19. The multi-function peripheral according to claim 16, wherein the setting table is further capable of setting a security setting with respect to each of the at least one website, the security setting being changeable according to an instruction of the setting change apparatus.

20. A non-transitory recording medium storing a computer readable program causing a computer incorporated in a multi-function peripheral including a browser function to execute:
a detection process to detect that the multi-function peripheral is not allowed to access a specific website;
an acquisition process to, in response to the detection process detecting that the multi-function peripheral is not allowed to access the specific website and without requiring action by a user, automatically acquire, from a storage incorporated in the multi-function peripheral, (i) access destination information of the specific website, (ii) identification information of the multi-function peripheral, (iii) user information, and (iv) contact information of an administrator of the multi-function peripheral;
a generation process to, when the detection process detects that the multi-function peripheral is not allowed to access the specific website, generate a request screen for making a setting change request to the administrator to change the setting to a setting that permits the multi-function peripheral to access the specific website, each piece of information acquired in the acquisition process being input to a respective item included in the request screen, wherein the request screen includes an area for accepting input of information regarding a reason for making the setting change request;
an input control process to display the request screen and accept input of an execution instruction to execute the setting change request through the request screen; and
a change request process to, upon the input of the execution instruction being accepted through the request screen, transmit the setting change request to the administrator via a network, based on the access destination information of the specific website, the identification information of the multi-function peripheral, the user information, and the contact information of the administrator, which are acquired in the acquisition process.

* * * * *